United States Patent
Peters et al.

(10) Patent No.: US 10,346,126 B2
(45) Date of Patent: Jul. 9, 2019

(54) USER PREFERENCE SELECTION FOR AUDIO ENCODING

(71) Applicant: QUALCOMM Incorporated, San Diego, CA (US)

(72) Inventors: Nils Günther Peters, San Diego, CA (US); Moo Young Kim, San Diego, CA (US); Dipanjan Sen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 417 days.

(21) Appl. No.: 15/269,567

(22) Filed: Sep. 19, 2016

(65) Prior Publication Data
US 2018/0081619 A1    Mar. 22, 2018

(51) Int. Cl.
*G06F 17/21* (2006.01)
*G06F 3/16* (2006.01)
(Continued)

(52) U.S. Cl.
CPC .............. *G06F 3/165* (2013.01); *G10L 19/24* (2013.01); *H04H 20/42* (2013.01); *H04H 20/82* (2013.01);
(Continued)

(58) Field of Classification Search
CPC ................. G06F 3/165; H04H 20/42
(Continued)

(56) References Cited

U.S. PATENT DOCUMENTS

| 4,199,761 A * | 4/1980 | Whyte ................ H02J 13/0075 |
| | | 340/310.12 |
| 2004/0176948 A1* | 9/2004 | Oh .......................... H04H 20/82 |
| | | 704/201 |

(Continued)

FOREIGN PATENT DOCUMENTS

| EP | 1173028 A2 | 1/2002 |
| WO | WO-0138993 A1 | 5/2001 |

OTHER PUBLICATIONS

Avestro J.E., et al., "Adaptive RTP-Compatible Audio Streaming for Handheld Clients (ARCASH)", International Conference on Computing & Informatics, ICOCI, Piscataway, NJ, USA, Jun. 6, 2006, pp. 1-8, XP031539403, ISBN: 978-1-4244-0219-9.

(Continued)

*Primary Examiner* — Andrey Belousov
(74) *Attorney, Agent, or Firm* — Paradice & Li LLP

(57) ABSTRACT

Methods and apparatuses are disclosed for streaming audio between a source device and a destination device. An example method may include determining an available bandwidth between the source device and the destination device. The example method may also include determining a bit rate for streaming audio from the source device to the destination device, wherein the bit rate is based on the available bandwidth. The example method may further include determining a preferred audio characteristic for streaming audio from the source device to the destination device, wherein the preferred audio characteristic is based on a user preference. The example method may also include determining encoded audio to be transmitted from the source device to the destination device based on the preferred audio characteristic and the bit rate.

28 Claims, 12 Drawing Sheets

(51) Int. Cl.
  *H04L 12/26*    (2006.01)
  *H04L 29/06*    (2006.01)
  *H04L 29/08*    (2006.01)
  *H04H 20/42*    (2008.01)
  *H04H 20/82*    (2008.01)
  *G10L 19/24*    (2013.01)
  *G10L 19/008*   (2013.01)
  *H04N 21/262*   (2011.01)
  *G10L 19/16*    (2013.01)

(52) U.S. Cl.
  CPC ...... *H04L 43/0882* (2013.01); *H04L 43/0888* (2013.01); *H04L 65/602* (2013.01); *H04L 65/607* (2013.01); *H04L 65/80* (2013.01); *H04L 67/306* (2013.01); *G10L 19/008* (2013.01); *G10L 19/167* (2013.01); *H04N 21/26216* (2013.01)

(58) Field of Classification Search
  USPC ........................................................ 715/215
  See application file for complete search history.

(56) References Cited

U.S. PATENT DOCUMENTS

| | | |
|---|---|---|
| 2008/0056145 A1 | 3/2008 | Woodworth |
| 2008/0232763 A1* | 9/2008 | Brady .............. H04N 21/44209 |
| | | 386/230 |
| 2013/0282917 A1 | 10/2013 | Reznik et al. |
| 2014/0086414 A1 | 3/2014 | Vilermo et al. |
| 2014/0310010 A1 | 10/2014 | Seo et al. |
| 2015/0302684 A1 | 10/2015 | Loose et al. |
| 2016/0111103 A1 | 4/2016 | Nagisetty et al. |

OTHER PUBLICATIONS

International Search Report and Written Opinion—PCT/US2017/045289—ISA/EPO—dated Oct. 13, 2017.
Paya A., et al., "A Cloud Service for Adaptive Digital Music Streaming", Eighth International Conference on Signal Image Technology and Internet Based Systems (SITIS), Nov. 25, 2012, pp. 910-917, XP032348607, DOI: 10.1109/SITIS.2012.135, ISBN: 978-1-4673-5152-2.

* cited by examiner

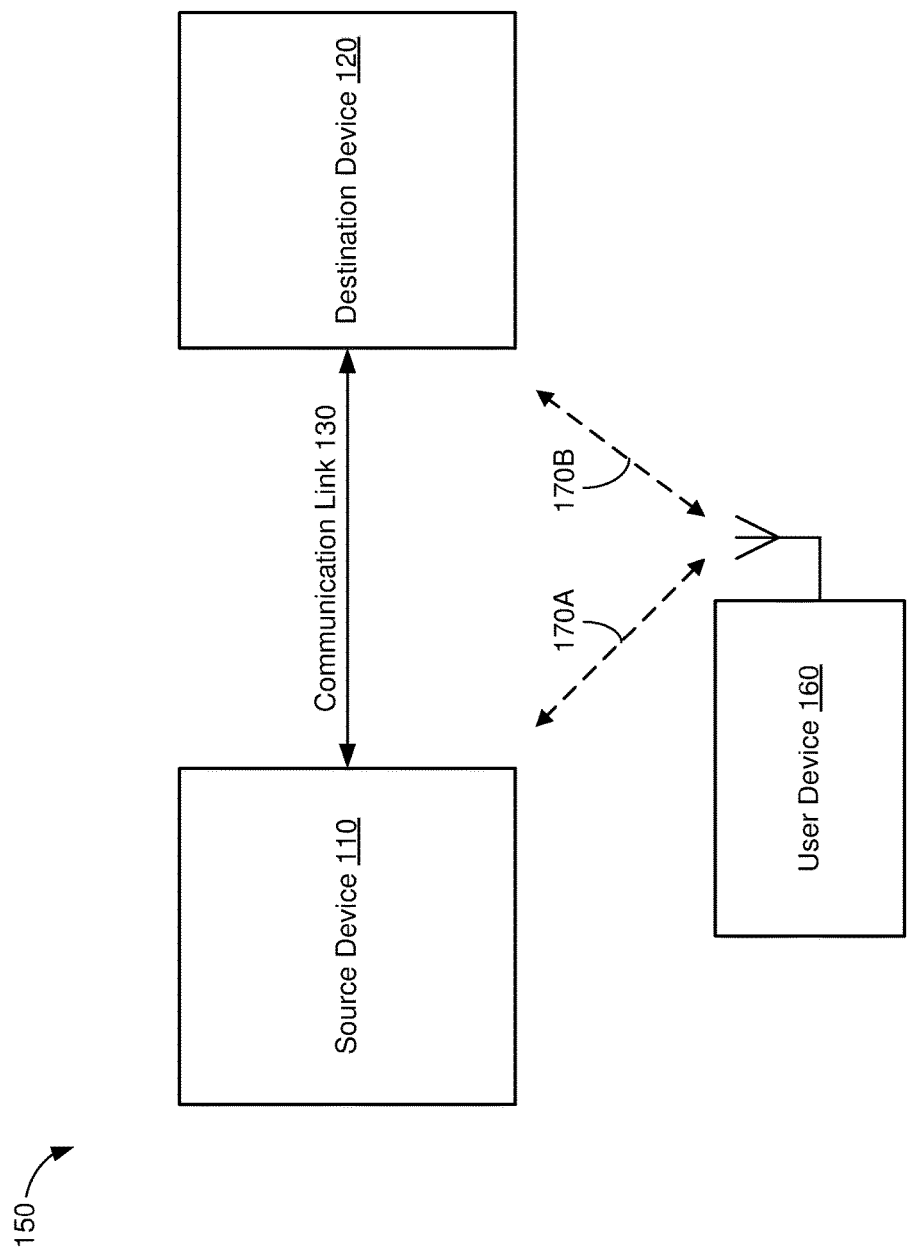

USER PREFERENCE SELECTION FOR AUDIO ENCODING

TECHNICAL FIELD

Various aspects described herein relate generally to audio encoding, and specifically to selecting audio encoding parameters based on user preferences.

BACKGROUND OF RELATED ART

Encoding audio information for streaming between a source device and a destination device in an audio system typically involves a trade-off between spatial quality and timbral quality. Spatial quality, which may be based on the number of channels provided by the audio system, may indicate the degree to which the audio system is able to present the 3-dimensional character of sound to listeners. Timbral quality may refer to the quality of a musical note or sound that distinguishes different types of sound production. For example, the timbral quality of an audio system may determine the degree to which a listener is able to distinguish between the same note or sound played on a guitar and played on a piano.

Conventional audio encoders may automatically determine the trade-off between spatial quality and timbral quality when encoding audio for streaming to the destination device. However, a user may have preferences regarding the relative importance of spatial quality and timbral quality of audio signals that differ from the automatic settings of audio encoders. Thus, it would be desirable to allow the user to determine or otherwise select the audio characteristics (e.g., the relative importance of spatial quality and timbral quality) of an audio stream to be encoded.

SUMMARY

This Summary is provided to introduce in a simplified form a selection of concepts that are further described below in the Detailed Description. This summary is not intended to identify key features or essential features of the claimed subject matter, nor is it intended to limit the scope of the claimed subject matter.

Aspects of the disclosure are directed to methods and apparatuses for streaming audio or to assist with streaming audio between a source device and a destination device. In one example, a method for streaming audio between a source device and a destination device is disclosed. The method may include determining an available bandwidth between the source device and the destination device; determining a bit rate for streaming the audio based on the available bandwidth; determining a preferred audio characteristic for streaming the audio based on a user preference; and determining encoded audio to be transmitted from the source device to the destination device based on the preferred audio characteristic and the determined bit rate.

In another example, a user device to assist with streaming audio is disclosed. The user device may include a processor, a user interface coupled to the processor and configured to receive a user preference from a user, and a memory coupled to the processor and the user interface. The memory may include one or more instructions that, when executed by the processor, cause the user device to determine an available bandwidth for streaming audio; determine a bit rate for streaming the audio based on the available bandwidth; determine a preferred audio characteristic for streaming the audio based on the user preference; and determine encoded audio to be transmitted from the source device to the destination device based on the preferred audio characteristic and the determined bit rate.

In another example, a non-transitory computer readable medium is disclosed. The non-transitory computer readable medium may comprise one or more instructions that, when executed by a processor of a user device, cause the user device to receive a user preference from a user; determine an available bandwidth for streaming audio between a source device and a destination device; determine a bit rate for streaming the audio based on the available bandwidth; determine a preferred audio characteristic for streaming the audio based on the user preference; and determine encoded audio to be transmitted from the source device to the destination device based on the preferred audio characteristic and the determined bit rate.

In another example, a user device to assist with streaming audio is disclosed. The user device may include means for receiving a user preference from a user; means for determining an available bandwidth between the source device and the destination device; means for determining a bit rate for streaming the audio based on the available bandwidth; means for determining a preferred audio characteristic for streaming the audio based on a user preference; and means for determining encoded audio to be transmitted from the source device to the destination device based on the preferred audio characteristic and the determined bit rate.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 1B shows an example system for streaming audio in accordance with other implementations.

DETAILED DESCRIPTION

Figure 1A:
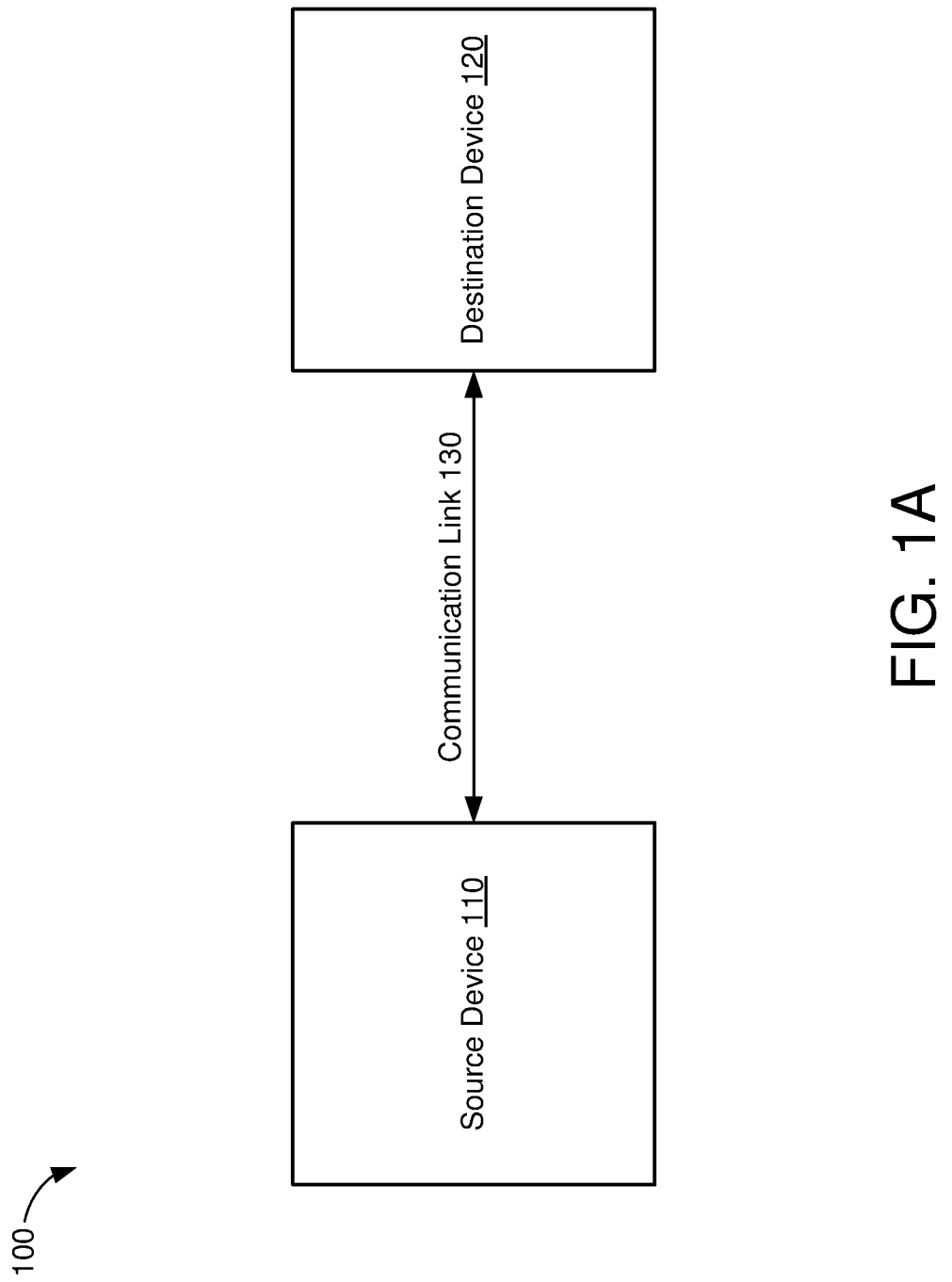
FIG. 1A shows an example system for streaming audio in accordance with some implementations.

Aspects of the disclosure are directed to apparatuses and methods for streaming audio or to assist with streaming audio between a source device and a destination device. One or more aspects of the disclosure may be implemented in a user device and/or a user interface that may allow a user to select a preferred audio characteristic for streaming audio between a source device and a destination device in an audio system. The preferred audio characteristic may be based on a spatial quality of an encoded audio and a timbral quality of the encoded audio. The audio system may determine a bit rate for streaming the audio based on an available bandwidth of the audio system, and then determine encoded audio to be transmitted from the source device to the destination device based on the preferred audio characteristic and the determined bit rate.

In the following description, numerous specific details are set forth such as examples of specific components, circuits, and processes to provide a thorough understanding of this disclosure. The term "coupled" as used herein means connected directly to or connected through one or more intervening components or circuits. As used herein, the term "user" may refer to any person that creates, produces, generates, controls, distributes, and/or listens to audio associated with aspects of the present disclosure. For one example, the user may be the creator of the audio (e.g., an artist that recorded a song, a producer that produced the song, and so on). In some aspects, the creator of the audio may create, generate, and/or store a plurality of audio bitstreams based, at least in part, on audio characteristic preferences of the listener. In other aspects, the creator of the audio may create, generate, and/or store a plurality of audio bitstreams based, at least in part, on audio characteristic preferences of the creator. For another example, the user may be a listener of audio output by an audio system configured in accordance with aspects of the present disclosure, and may provide his or her audio characteristic preferences to the audio system via the user device or user interface.

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring this disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In this disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout this disclosure, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure. Also, the example wireless communications devices may include components other than those shown, including well-known components such as a processor, memory and the like.

For audio encoding, an available bandwidth between source and destination devices may determine an amount of audio quality degradation needed for an encoded audio stream to satisfy a corresponding overall bit rate. More specifically, to meet available bandwidth constraints, it may be necessary to sacrifice at least one aspect of audio quality when encoding an audio stream. Example aspects of audio quality may include, but are not limited to, spatial quality (e.g., the number of channels for the audio), timbral quality (e.g., the bit rate per each channel), the frequency range of audio encoding (e.g., the minimum frequency and/or the maximum frequency of the audio before the original audio being encoded is clipped), and so on. In one example, the overall bit rate of encoded audio may be expressed as:

$$\text{Overall Bit Rate} = \text{Number of Channels} * \text{Bits per Channel} + \text{Metadata} \quad (1)$$

It should be noted that, in the above equation, the number of bits per channel is the same for each channel. However, example embodiments disclosed herein may use the same or different bits per channel for encoding each channel. Additionally, the number of bits and/or channels may be static or may change over time. The metadata may include control information, overhead, or any other information not directly related to the sampling of the audio. Therefore, the metadata may be any size, in any form, or in some embodiments may not exist. Thus, the above equation 1 should not limit the examples or embodiments in any way and is for illustrative purposes only.

As indicated above, the overall bit rate may be decreased by decreasing or limiting the spatial quality of the audio, by decreasing or limiting the timbral quality of the audio, and/or by decreasing or limiting the frequency range of the audio. The spatial quality may be limited by limiting the number of channels being encoded, the timbral quality may be limited by limiting the bit rate per channel, and the frequency range may be limited by limiting the amount of deep bass, high treble, or varying levels of mid-level frequencies being encoded. To make audio sound as full or as close to the original audio sample as possible while meeting available bandwidth constraints, it is desirable to select an optimal balance between spatial quality, timbral quality, and frequency range of the encoded audio.

For example, regarding spatial quality, monophonic sound may imply that the spatial quality is one channel to be encoded, and stereophonic sound may imply that the spatial quality is two or more channels to be encoded, such as 2.1 being three channels, 5.1 being six channels, 7.1 being eight channels, and so on, where the number of channels equals or is otherwise related to the number of loudspeakers to play the encoded audio. Alternatively, or in addition, the number of channels may equal or may be related to the number of sound sources that an audio system attempts to replicate (e.g., a virtual sound stage, degree of range of mimicking sound sources, and so on). For example, for binaural audio, the number of audio channels may be greater than for typical home theatre setups. In another example regarding ambisonics, the higher the order of ambisonics, the more channels typically needed to more accurately reproduce the original audio.

In an example regarding timbral quality, each channel of the audio may be encoded at a particular bit rate. In some examples, the bit rate may refer to the number of samplings of the audio source over a time period (e.g., one second) multiplied by the number of bits used to encode each sampling for each channel (e.g., 16 bits), for example, as expressed below:

$$\text{Bit Rate} = \text{Number of Samplings per Second} * \text{Bits per Sampling} \quad (2)$$

Some nomenclatures for defining bit rate are kilobits per second (kbps) and megabits per second (Mbps).

A user may have one or more preferences for the audio characteristics of the encoded audio in addition to the overall bit rate of the audio encoding. For example, if a user has only one loudspeaker, the user may prefer to maintain spatial quality over timbral quality. In another example, different types of music or audio (e.g., electronica versus classical music, music versus spoken audio, and so on) may mean that the user has different preferences regarding the trade-off between spatial quality and timbral quality. Therefore, example methods and apparatuses are disclosed herein that may allow a user to control, or assist in controlling, the balancing of audio characteristics (e.g., the spatial quality and the timbral quality of the encoded audio) for streaming audio. It should be noted that streaming audio may be in the context of audio itself (e.g., music, radio, podcasts, and so on) or multimedia (e.g., television, movies, audio/video presentations or live events, and so on), and the example embodiments are not limited to a specific example of content.

FIG. 1A shows an example system 100 for streaming audio in accordance with some implementations. The system 100 generally includes a source device 110, from which an encoded audio stream originates, and a destination device 120, to which the encoded audio stream is destined for decoding and/or output via headphones or a number of speakers. The source device 110 and the destination device 120 may be communicably linked via a communication link 130. Example source devices may include, but are not limited to, content providers (e.g., Netflix®, Amazon® Video, Spotify®, Pandora®), live or recoded television or radio providers (e.g., NBC®, ABC®, CBS®), a cache server hosting encoded audio and/or multimedia streams, a mobile production studio (e.g., for coverage of live sporting or concert events), a sound or television/movie studio, and so on. Example destination devices may include, but are not limited to, a home or car audio system, a computer coupled to a loudspeaker system, a mobile communication device (e.g., a smartphone, tablet, laptop computer, and so on), a client incorporating Dynamic Adaptive Streaming over HTTP (DASH client), and so on.

The communication link 130 may be all or a portion of the link coupling the destination device 120 to the source device 110. The communication link 130 may be a wireless connection (e.g., Wi-Fi®, cellular, BLUETOOTH® (Bluetooth or BT), and so on), a wired connection (audio cable, Ethernet, fiber optic, digital subscriber line, cable TV, plain old telephone system, and so on), a combination of wireless and wired connections, and/or have portions that may be any of the aforementioned. The communication link 130 may also pass through the internet or other distributed resources, such as a local area network (LAN) or wide area network (WAN).

A user for the example system 100 may be an end user (e.g., a person listening to the audio or interacting with the destination device), a producer (e.g., a person assisting in creating the encoded audio stream, such as a music studio technician, A/V producer for television, and so on), or other persons that may interact with the example system 100.

In one example, the destination device 120 may be a cellular enabled device (e.g., a tablet or smartphone) attempting to stream a movie from a source device 110 that is a content provider over a cellular network. Thus, in some aspects, the communication link 130 may be a cellular connection between the cellular enabled device to a cellular tower and/or a portion of the backhaul from the cellular tower to the content provider. In another example, the destination device 120 may be a wireless enabled device (e.g., a tablet or smartphone) attempting to stream a movie from a source device 110 that is a content provider over a wireless network (e.g., Wi-Fi or Bluetooth network). Thus, in other aspects, the communication link 130 may be a wireless connection between the wireless enabled device to a wireless access point (AP) and/or a portion of the backhaul from the cellular tower to the content provider.

For implementations in which the user is a person watching a movie, an available bandwidth of the system may be limited by, for example, an average or peak connection speed between the tablet or smartphone and the cellular tower or AP, the backhaul, the load on the connection server at the content provider, the size of video data to be streamed with audio, and so on. The available bandwidth may also be affected by specific user information. For example, the content provider may set a maximum available bandwidth or overall bit rate for a particular user based on a user's subscription level (e.g., based on whether the user is a free member, has a standard subscription, or has a premium subscription).

Additionally, the available bandwidth of system 100 may fluctuate over time. Therefore, an encoded audio may be transmitted by transmitting a time segment of the encoded audio, wherein different segments of different overall bit rates depending on the available bandwidth are stitched together. Hence, the person watching the movie may receive higher fidelity audio during times when the connection speed between the tablet or smartphone and the cellular tower or AP increases, and may receive lower fidelity audio during times when the connection speed between the tablet or smartphone and the cellular tower or AP decreases.

FIG. 1B shows an example system 150 for streaming audio in accordance with other implementations. The system 150 depicted in FIG. 1B is similar to the system 100 of FIG. 1A, with the addition of a user device 160 that may allow the user to communicate with the source device 110 via a first link 170A and/or with the destination device 120 via a second link 170B. While the user device 160 is shown in FIG. 1B as coupled to the source device 110 and the destination device 120 wirelessly, the user device 160 may be coupled to the source device 110 and the destination device 120 by wired connections. The user device 160 may be any type of communication device, such as a mobile communication device (e.g., smartphone, tablet, and so on), an interactive audio system (e.g., Amazon® Echo), a remote control (e.g., Logitech® Harmony® remote or a Nest® compatible smart home remote), and so on. For one example, the user device 160 may be a tablet coupled to a mixing board in a sound studio, or may be a sports television producer's smartphone communicating with the audio encoder used for a live sporting event. For another example, the user device 160 may be a tablet or smartphone joined to a person's home wireless network for controlling devices in a smart home.

Figure 2:
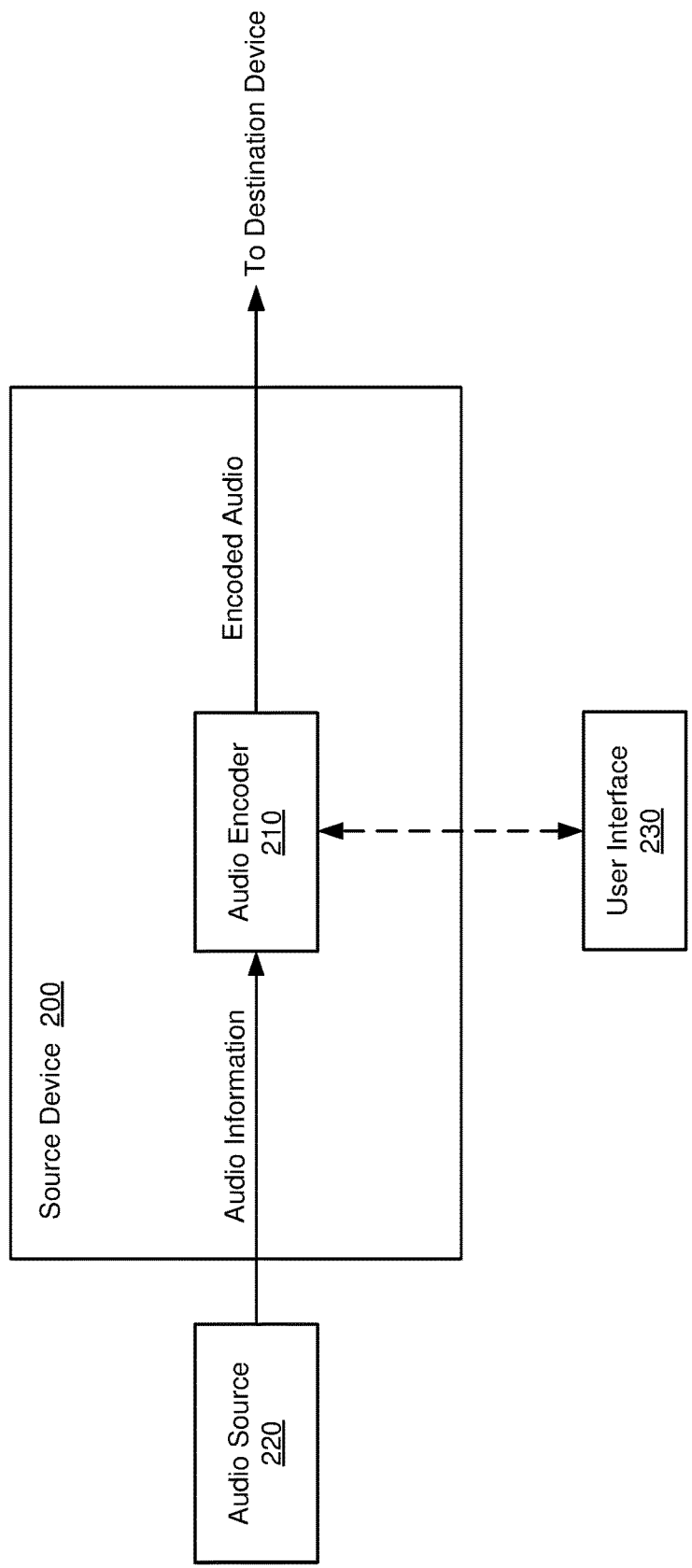
FIG. 2 shows an example source device that may be one implementation of the source device of FIGS. 1A and 1B.

FIG. 2 shows an example source device 200 that may be one implementation of the source device 110 of FIGS. 1A and 1B. The source device 200 may include an audio encoder 210 to encode audio information received from an audio source 220 (e.g., a microphone, a CD player, an MP3 player, an iPod®, a web-based music service, and the like). The source device 200 may optionally include or be coupled to a user interface 230 to indicate audio characteristics (e.g., spatial quality and timbral quality) of the encoded audio and/or to receive user preferences regarding audio quality and/or audio characteristics at an overall bit rate of the encoded audio (e.g., number of channels versus bit stream per channel). Although the user interface 230 is depicted in the example of FIG. 2 as being separate from source device 200, for other implementations, the user interface 230 may be part of or integrated within source device 200.

For some implementations, user preferences received by the user interface 230 may be used by the audio encoder 210 to determine one or more encoding parameters for encoding the received audio information to generate the encoded audio to be transmitted to the destination device 120. In some aspects, the user preferences may be provided by an end-user (e.g., a listener of audio output by an audio system configured in accordance with aspects of the present disclosure). In other aspects, the user preferences may be provided by the creator, producer, or distributer of the audio, for example, to generate multiple encoded audio streams each based on a different audio characteristic preference.

In addition or alternatively, the source device 200 may include or access a database containing a plurality of pre-encoded audio at different overall bit rates and different audio characteristics. In some aspects, a content provider may store a plurality of "candidate" encodings of a song in various bit rates and various audio characteristics (e.g., combinations of 32 kbps, 128 kbps, 192 kbps and 2 channels, 3 channels, 4 channels, and so on). In this manner, the content provider may use the received user preference(s) to select the appropriate candidate encoded audio for streaming to the destination device. In other aspects, a creator of the audio (e.g., an artist, a producer, and/or a distributor) may generate and/or store a plurality of candidate encodings of a song in various bit rates and various audio characteristics (e.g., combinations of 32 kbps, 128 kbps, 192 kbps and 2 channels, 3 channels, 4 channels, and so on), for example, with each of the plurality of candidate encodings based on a corresponding one of a plurality of user preferences. In this manner, the source device 200 may generate a plurality of different audio bitstreams based on different user preferences.

In another embodiment, the source device 200 may receive user preferences from the destination device 120 (not shown in FIG. 2 for simplicity) or the user device 160 (not shown in FIG. 2 for simplicity) in order to determine audio characteristics at an overall bit rate for the encoded audio. In some examples, the source device 200 may adjust audio encoding parameters such as spatial quality (number of channels), timbral quality (bits per channel), and/or sampling rate when encoding an audio from the source. Thus, the audio encoder 210 may encode an audio multiple times to generate a plurality of candidate encoded audios at a plurality of bit rates, wherein a subset of the candidate encoded audios is encoded at the same bit rate but have differing audio characteristics (e.g., differing spatial qualities and/or timbral qualities). In some aspects, the audio encoder 210 may encode the audio multiple times based on user preferences provided by an end-user (e.g., a listener) via the user interface 230. In other aspects, the audio encoder 210 may encode the audio multiple times based on user preferences provided by the creator of the audio (e.g., an artist, producer, or distributer) via the user interface 230.

Figure 3:
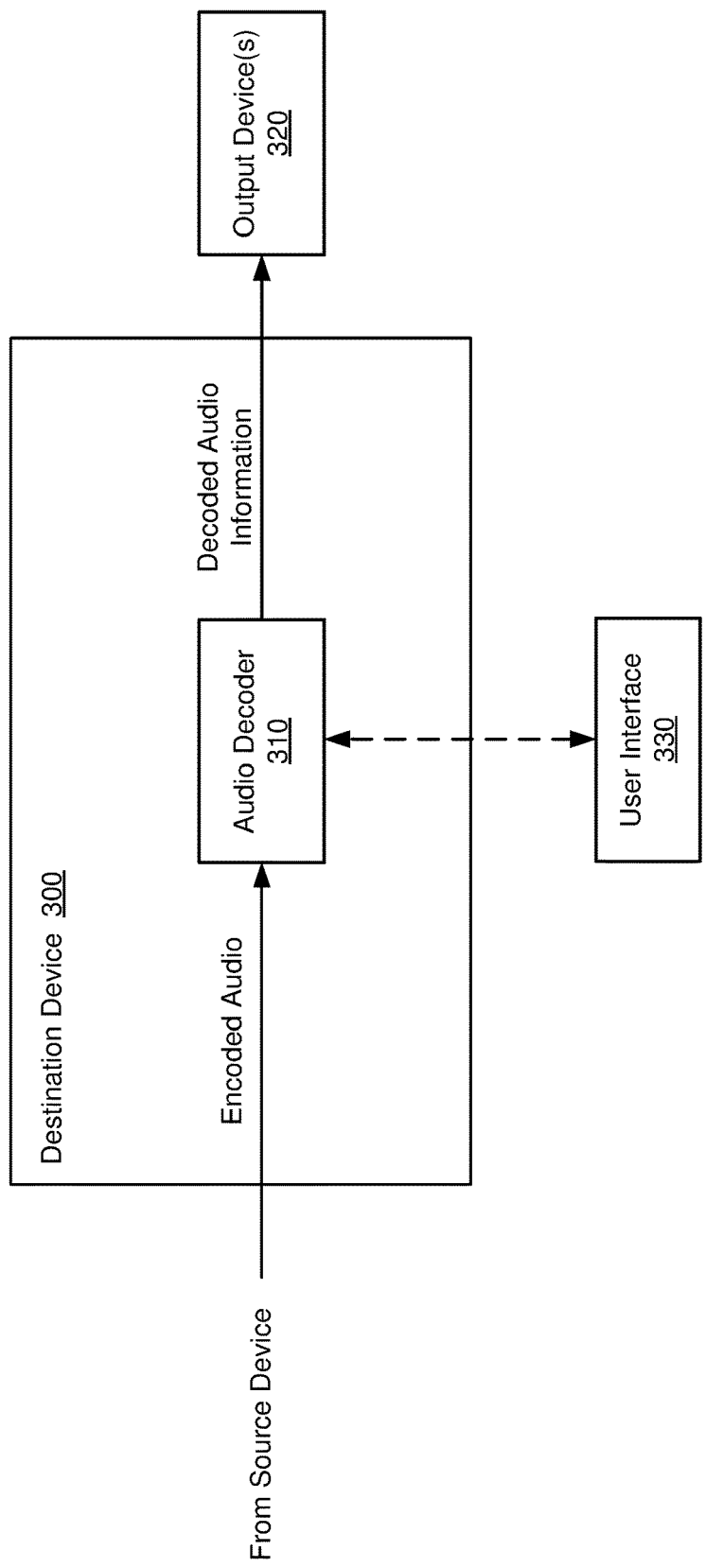
FIG. 3 shows an example destination device that may be one implementation of the destination device of FIGS. 1A and 1B.

FIG. 3 shows an example destination device 300 that may be one implementation of the destination device 120 of FIGS. 1 and 1B. The destination device 300 may include an audio decoder 310 to decode the encoded audio from the source device 110. The decoded audio information may be played by an output device 320 (e.g., a loudspeaker, headphones, TV, and so on), which may be coupled to or integrated into the destination device 300. The destination device 300 may optionally include or be coupled to a user interface 330 to indicate audio characteristics (e.g., spatial quality and timbral quality) of the encoded audio to be played and/or to receive user preferences from the listener regarding audio quality and/or audio characteristics at an overall bit rate of the encoded audio (e.g., number of channels versus bit stream per channel). Although the user interface 330 is depicted in the example of FIG. 3 as being separate from destination device 300, for other implementations, the user interface 330 may be part of or integrated within destination device 300.

Figure 4:
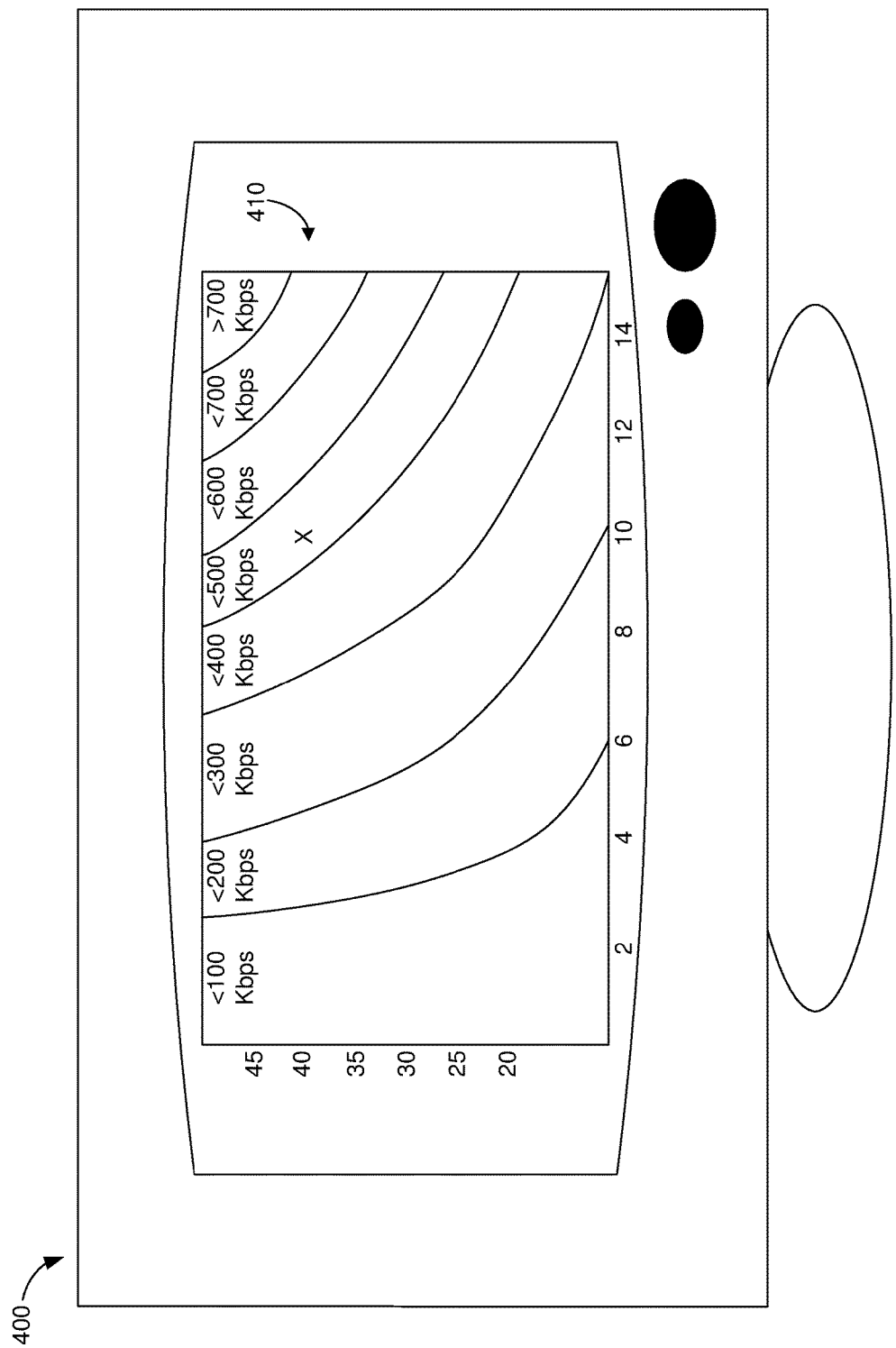
FIG. 4 shows an example user interface that may be implemented within the user device of FIG. 1B and/or within the user interfaces of FIGS. 2 and 3.

FIG. 4 shows an example user interface 400 that may be implemented within the user device 160 of FIG. 1B, the user interface 230 of FIG. 2, and/or the user interface 330 of FIG. 3. Although the user interface 400 uses a graphical user interface, the user interface 400 may include a text, haptic, audible or other type of interface to interact with the user. The user interface 400 includes a display 410 to present or indicate audio quality information to the user. The user may interact with the user interface 400 through touch, speech, a mouse, a keyboard, or any other suitable user input. As discussed above, in some aspects, the user may be a listener of the audio, while in other aspects, the user may be a creator of the audio (e.g., an artist, a producer, and/or a distributor).

Figure 5:
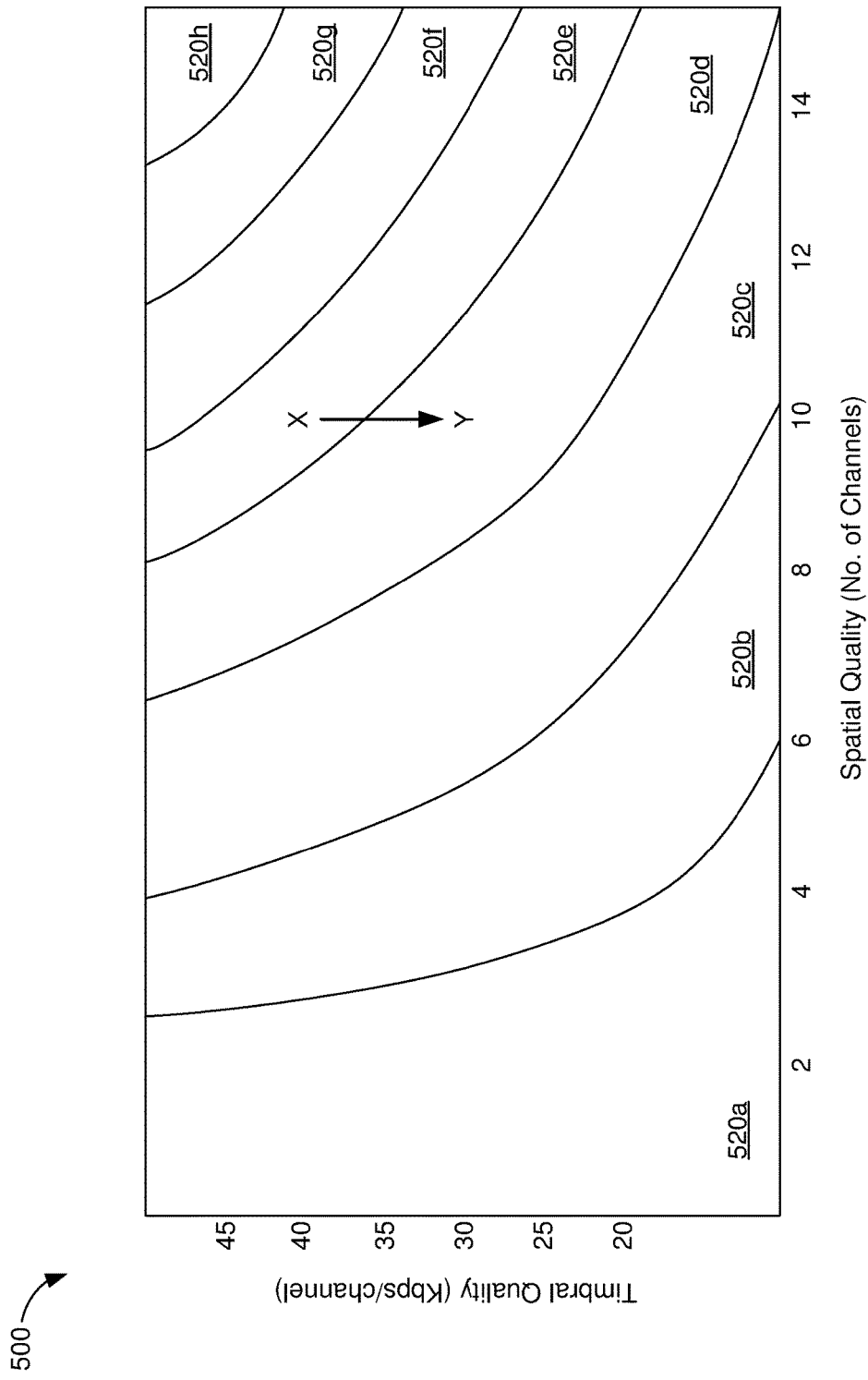
FIG. 5 shows an example graph that may be presented by the interface device of FIG. 4 in accordance with some implementations.

FIG. 5 shows an example graph 500 that may be presented by or on the user interface 400 of FIG. 4 in accordance with some implementations. The graph 500 may indicate, to the user, the relationship between the timbral quality and the spatial quality for audio encodings. The horizontal axis of the graph 500 indicates spatial quality in terms of number of channels. The vertical axis of the graph 500 indicates timbral quality in terms of kbps per channel. While a two-dimensional graph 500 is shown in the example of FIG. 5, other representations may be used. For example, each channel may have its own one-dimensional graph indicating timbral quality if different channels are encoded at different bit rates.

In some aspects, the graph 500 may include a number of delineated areas 520a-520h for different overall bit rate ranges. For example, a first delineated area 520a may represent bit rates ranging between 0-100 kbps, a second delineated area 520b may represent bit rates ranging between 100-200 kbps, and so on, with the axes illustrating the number of channels and the range of bit rates for each of the delineated areas 520a-520h. Thus, as depicted in FIG. 5, the delineated areas 520a-520h of the example graph 500 may indicate a bit rate of the audio encoding as a function of timbral quality versus spatial quality.

The graph 500 may also include a current bit rate indicator X that indicates the spatial quality and the timbral quality of the encoded audio. For the example of FIG. 5, the current bit rate indicator X may represent an overall bit rate of 400 kbps, where the audio encoding includes 10 channels and each channel's bit rate is 40 kbps.

In some implementations, a content provider or other source device may limit the overall bit rate available to a particular user. For example, a user with a free account for the content provider may be limited to an overall bit rate under first level of kbps; a user with a standard paid subscription for the content provider may be limited to an overall bit rate of under a second level of kbps; and a user with a premium subscription for the content provider may have no restrictions on overall bit rate. The graph 500 may therefore display to the user what bit rates are allowed by the content provider for that user (e.g., by darkening or marking as unavailable one or more of the delineated areas 520a-520h if the user has a standard subscription).

In some aspects, a user may provide his or her preferences regarding audio characteristics (e.g., a preference for spatial quality or a preference for timbral quality) by interacting with the graph 500. For one example, a user may select different points on the graph 500 for each of the delineated areas 520a-520h to indicate spatial quality preferences in relation to timbral quality preferences for different overall bitrates. For another example, the user may indicate whether spatial quality or timbral quality is of more importance. For yet another example, the user may indicate a range of number of channels and a bit rate per channel to assist in determining the encoded audio stream to be used for one or more overall bit rates.

Any means of indicating a user's preference may be used, including sliders for spatial quality and timbral quality separate from the graph 500, allowing the user to draw boxes on the graph 500, allowing the user to select portions of each axis of the graph 500, allowing the user to select portions of each delineated area 520a-520h, and so on.

In other aspects, a user profile may be used to determine the user's preference regarding spatial quality and timbral quality. For example, the user profile may be created from previously provided user preferences (e.g., a completed questionnaire, previous interactions with the graph 500, and so on) such that the system knows, for example, whether to preserve spatial quality or timbral quality when meeting available bandwidth constraints. The user profile may also include variations to the user's preferences based on, for example, the type of content being streamed, the user's current output device, and so on.

The graph 500 may also indicate if the overall bit rate of the encoded audio changes (e.g., based on a change in available bandwidth or sudden expiration of a subscription). For example, if the overall bit rate of the encoded audio stream is reduced from 400 kbps (as indicated by the current bit rate X) to 300 kbps, and the system is to preserve spatial quality, the graph 500 shows that spatial quality may be preserved at ten channels when the timbral quality is reduced from 40 kbps/channel to 30 kbps/channel (as indicated by the new bit rate Y).

Figure 6:
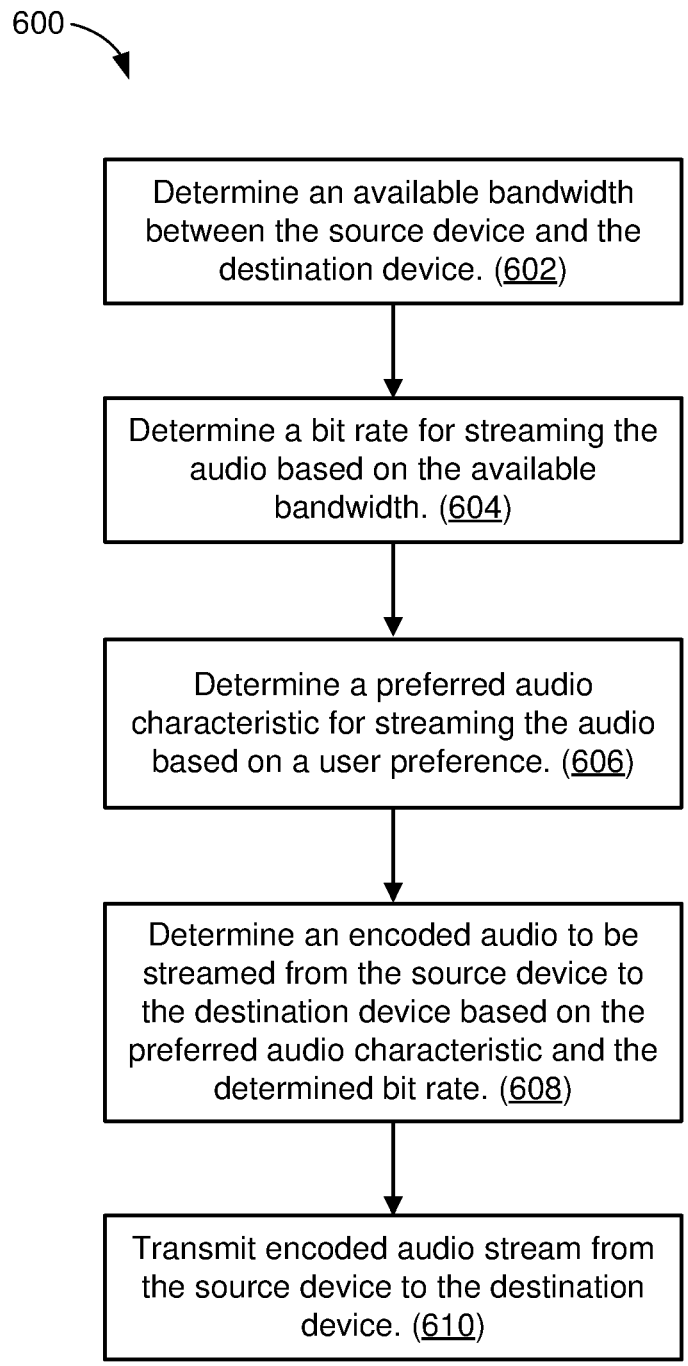
FIG. 6 is an illustrative flow chart depicting an example operation for determining an encoded audio stream in accordance with some implementations.

FIG. 6 is an illustrative flow chart depicting an example operation 600 for determining an encoded audio stream in accordance with some implementations. The example operation 600 may be performed by the source device 110 of FIGS. 1A-1B, the destination device 120 of FIGS. 1A-1B, the user device 160 of FIG. 1B, or any combination of those devices.

First, an available bandwidth is determined for streaming audio from the source device 110 to the destination device 120 (602). In some aspects, the available bandwidth may correspond to the available bandwidth of a communication link between the source device 110 and the destination device 120. For one example, a smartphone operating as the destination device 120 may determine that up to 400 kbps is available for streaming audio between the smartphone and the cellular tower or AP, and/or may determine that the connection speed with a content provider allows for up to 400 kbps without quality of service for other processes being impacted. For another example, a content provider operating as the source device 110 may determine that the number of concurrently streaming destination devices corresponds to allowing a specific fraction of the total bandwidth from the content provider for one user. For yet another example, a smartphone operating as the user device 160 may perform a test to determine or request and receive information regarding a connection speed between a streaming set top box and an internet service provider.

In other aspects, the available bandwidth may correspond to a maximum bandwidth allowed by the source device 110 for the user. For example, a content provider operating as the source device 110 may limit a user's bandwidth based on a user subscription or profile.

Next, a bit rate for streaming the audio may be determined based on the available bandwidth (604). In some aspects, the destination device 120 may determine the bit rate for streaming the audio based on the available bandwidth. In other aspects, the source device 110 may determine the bit rate for streaming the audio based on the available bandwidth. In still other aspects, the user device 160 may determine the bit rate for streaming the audio based on the available bandwidth.

Then, a preferred audio characteristic for streaming the audio may be determined based on a user preference (606). For at least some implementations, the user preference may indicate whether spatial quality or timbral quality is of more importance to the user. More specifically, the user preference may indicate a preference for maintaining spatial quality, a preference for maintaining timbral quality, a preference for maintaining a ratio between spatial quality and timbral quality, and so on. For example, referring also to FIG. 5, if the encoded audio's overall bit rate is to be 400 kbps and the user's preference is to maintain spatial quality, then the minimum number of channels may be set at ten (e.g., to preserve spatial quality) while the bit rate may be reduced (e.g., thereby sacrificing timbral quality to achieve the overall bit rate).

As discussed above, for some implementations, the user preferences may be provided via a user device (e.g., user device 160 of FIG. 1B) coupled to either the source device 110 or the destination device 120, while for other implementations, the user preferences may be provided via a user interface (e.g., user interface 230 of FIG. 2) provided within or otherwise associated with the source device 110. Further, in some aspects, the user preferences may be provided by a listener of the audio, while in other aspects, the user preferences may be provided by a creator of the audio (e.g., an artist, a producer, and/or a distributor).

Thereafter, an encoded audio to be streamed from the source device 110 to the destination device 120 may be determined (608). For example, if the destination device 120 determines that the encoded audio stream should have ten channels and the overall bit rate should be 400 kbps, then the destination device 120 may request from the source device 110 an encoded audio with ten channels and an overall bit rate as close as possible to 400 kbps (e.g., the timbral quality being 40 kpbs/channel). For an example in which the source device 110 stores multiple encodings of a song at different bit rates and different spatial/timbral qualities and determines that the song should be encoded with ten channels and an overall bit rate of 400 kbps, the source device 110 may select the encoding closest to having 10 channels and an overall bit rate of 400 kbps. For an example in which the user device 160 determines the encoded audio to be streamed, the user device 160 may request an audio stream from the source device 110 in a manner similar to that described above with respect to the destination device 120 requesting the audio stream from the source device 110.

Once the encoded audio for streaming is determined, the encoded audio stream may be transmitted from the source device 110 to the destination device 120 (610).

Figure 7A:
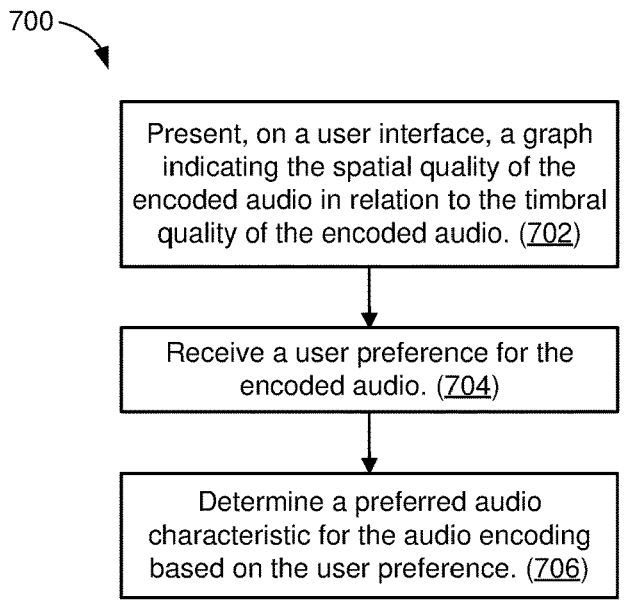
FIG. 7A is an illustrative flow chart depicting an example operation for determining a user's preferred audio characteristics in accordance with some implementations.

FIG. 7A is an illustrative flow chart depicting an example operation 700 for determining a preferred audio characteristic for streaming audio in accordance with some implementations. First, a graph is presented, to the user on a user interface, indicating the spatial quality of the encoded audio in relation to the timbral quality of the encoded audio (702). In some aspects, the display 410 of FIG. 4 may present the example graph 500 of FIG. 5 to the user. As discussed above, the example graph 500 may graphically illustrate the relationship between the spatial quality of the encoded audio and the timbral quality of the encoded audio.

Next, a user preference may be received (704). As discussed above, the user preference may indicate a preference to maintain spatial quality, a preference to maintain timbral quality, or a preference to maintain a desired ratio or relationship between spatial quality and timbral quality. In some aspects, the user preference may be received via a user interaction with the graph 500. In other aspects, the user preference may be retrieved from a stored user profile. For example, referring also to FIG. 5, if a user insists on a minimum of ten channels in the encoded audio, then the user may select the Number 10 on the horizontal axis of the example graph 500.

Then, a preferred audio characteristic of the audio encoding is determined based on the user preference (706). For example, referring also to FIG. 5, if the user insists on a minimum of ten channels in the encoded audio, then the selection of 10 may be used to determine that the audio characteristic is to preserve spatial quality, for example, by ensuring that the encoded audio stream will have a minimum of ten channels.

Figure 7B:
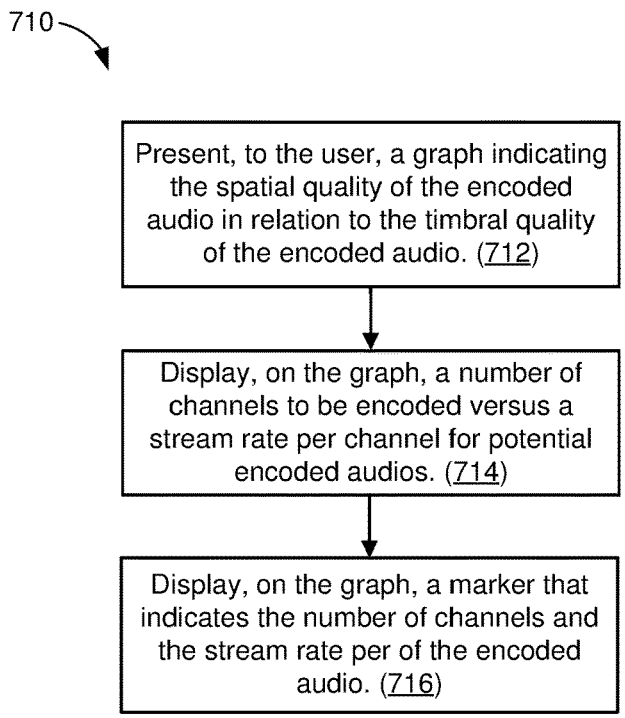
FIG. 7B is an illustrative flow chart depicting an example operation for presenting a relationship between spatial quality and timbral quality to a user in accordance with some implementations.

FIG. 7B is an illustrative flow chart depicting an example operation 710 for presenting a relationship between spatial quality and timbral quality to a user in accordance with some implementations. First, a graph is presented to the user that indicates the spatial quality of the encoded audio in relation to the timbral quality of the encoded audio (712). In some aspects, the display 410 of FIG. 4 may present the example graph 500 of FIG. 5 to the user. As discussed above, the example graph 500 may graphically illustrate the relationship between the spatial quality of the encoded audio and the timbral quality of the encoded audio.

A number of channels to be encoded versus a stream rate per channel may be displayed on the graph (714), and a marker that indicates the number of channels and the stream rate per channel of the encoded audio may be displayed on the graph (716). Referring again to FIG. 5, the example graph 500 is shown to display the number of channels to be encoded (e.g., on the horizontal axis) versus a stream rate per channel (e.g., on the vertical axis). The graph 500 may also display the marker X indicating the number of channels and the current bit rate per channel of the encoded audio.

Figure 8:
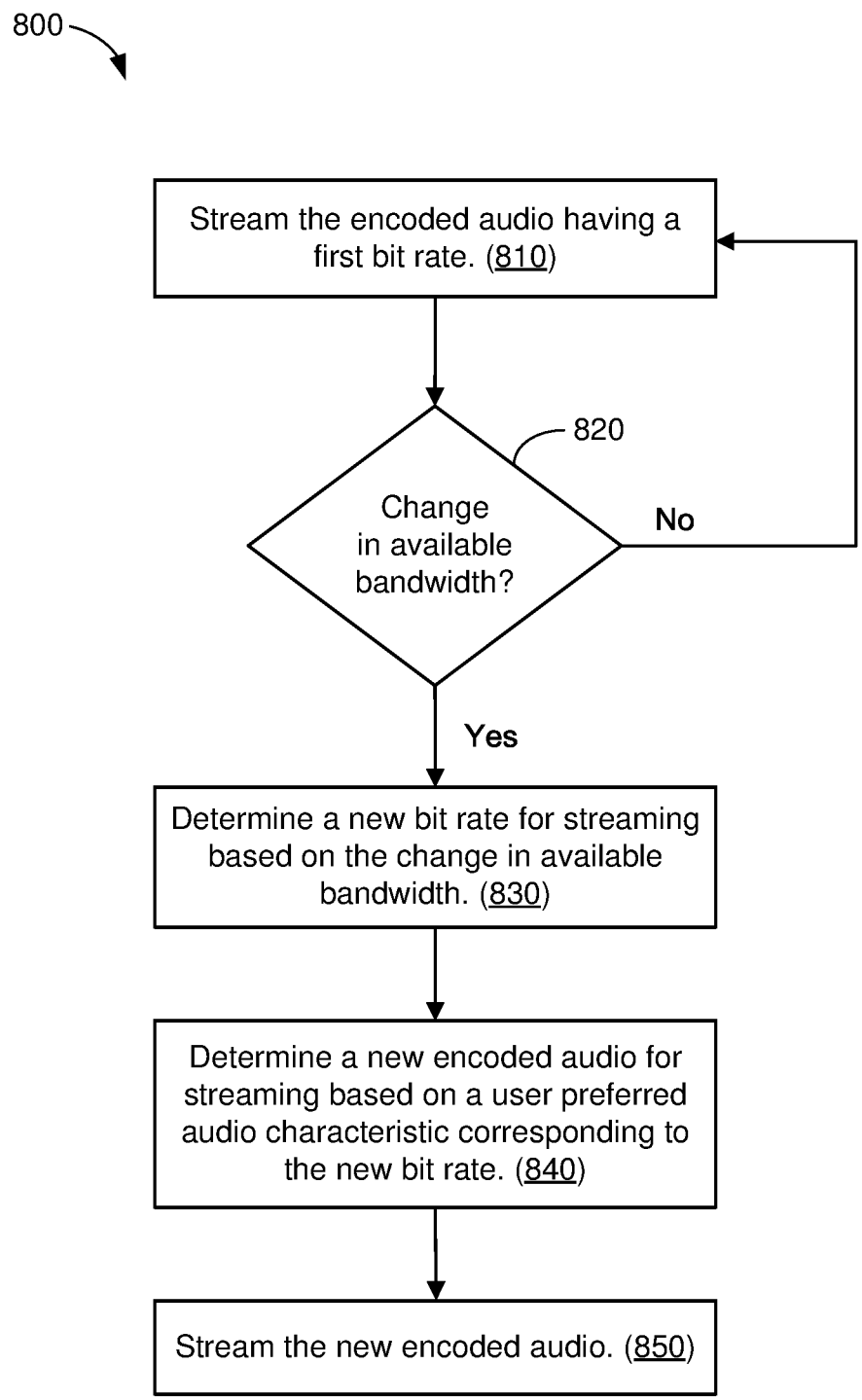
FIG. 8 is an illustrative flow chart depicting an example operation for changing the overall bit rate of an encoded audio stream in accordance with some implementations.

As discussed above, the available bandwidth may fluctuate over time. Therefore, the overall bit rate of the encoded audio being streamed may also change over time. FIG. 8 is an illustrative flow chart depicting an example operation 800 for changing the overall bit rate of an encoded audio being streamed in accordance with some implementations. First, a source device 110 streams an encoded audio at a first overall bit rate to the destination device 120 (810). Periodically or concurrently with streaming the encoded audio at a first bit rate to the destination device 120, the source device 110 may determine whether there is a change in available bandwidth (820). For example, the source device 110 may determine if the available bandwidth drops below a threshold associated with the first bit rate or if the reduction in bandwidth persists over an amount of time. Alternatively, the source device 110 may determine that the available bandwidth has increased.

If the source device 110 does not determine a change in the available bandwidth, as tested at 820, then the source device 110 continues streaming the encoded audio at the first bit rate (810). Conversely, if the source device 110 determines that there is a change in the available bandwidth, then the source device 110 determines a new bit rate for streaming based on the change in available bandwidth (830). For example, if the source device 110 is streaming encoded audio having an overall bit rate of 400 kbps and determines that the new available bandwidth will not support continued streaming of the encoded audio at 400 kbps, the source device 110 determines a lower bit rate of the audio encoding that can be streamed.

Then, the source device 110 determines a new encoded audio for streaming based on a user preferred audio characteristic corresponding to the new bit rate (840). For example, if the source device 110 determines that an overall bit rate of 300 kbps can be supported and a user prefers to maintain spatial quality, the source device 110 may determine that the new encoded audio will have the same spatial quality but a lower timbral quality than the previous encoded audio (e.g., an encoded audio having the same number of channels as the encoded audio that was being streamed but with a lower bit rate per channel). Once the new encoded audio is determined, the source device 110 streams the new encoded audio to the destination device 120 (850).

Although the example operation 800 of FIG. 8 is described from the perspective of the source device 110 performing the described operations, other embodiments exist where any portion or all of the operations may be performed by the destination device 120 and/or by the user device 160. For example, a destination device 120 may determine a change in available bandwidth as a result of, e.g., congestion in a home network, a change in cellular connection from 4G to 3G to EDGE, a needed increase in bandwidth for other programs communicating concurrently on the destination device 120, and so on. In another example, the operation of block 850 may be performed by the destination device 120 requesting the source device 110 to transmit the new encoded audio.

Figure 9:
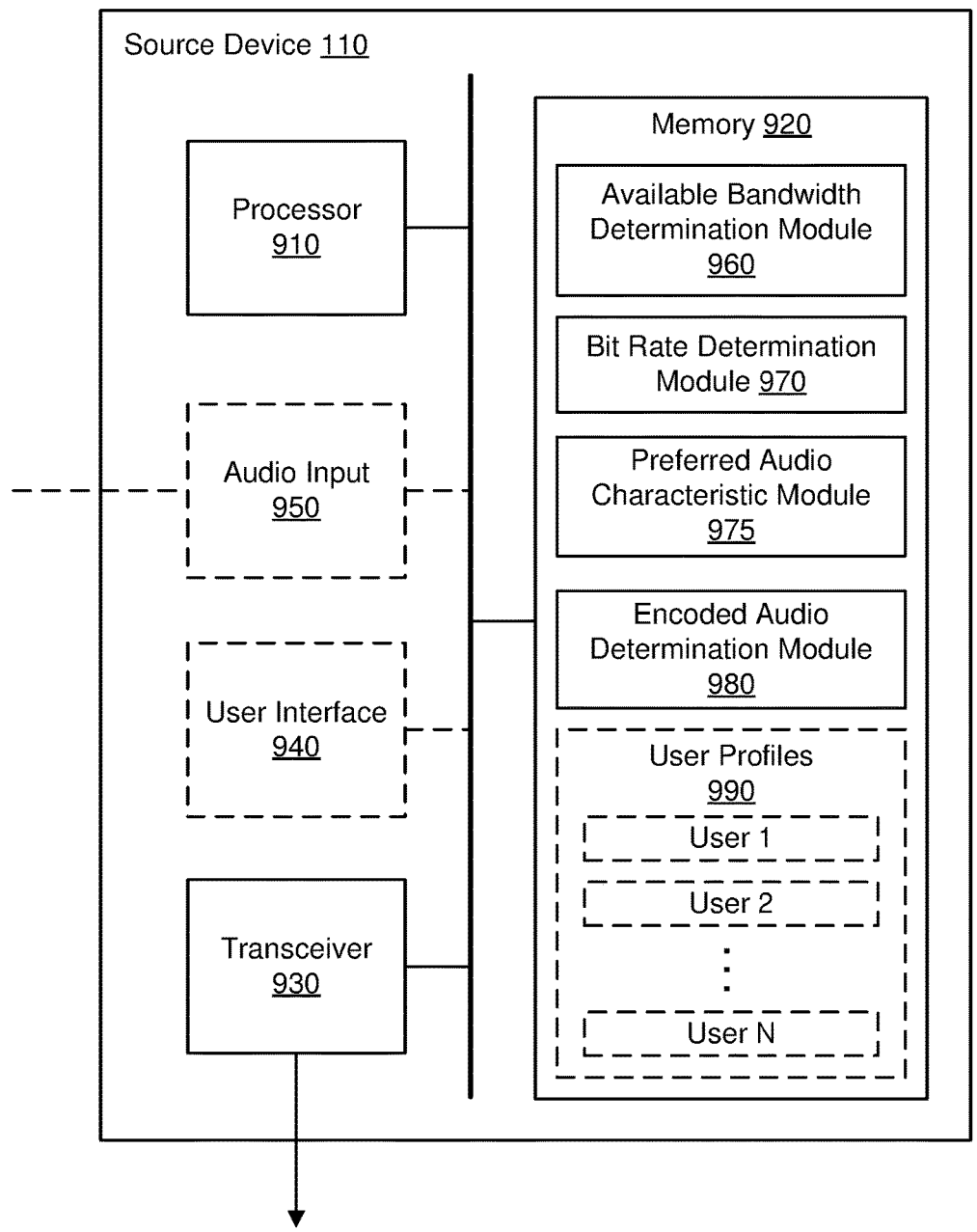
FIG. 9 is an example block diagram of the source device of FIGS. 1A, 1B, and 2 in accordance with some implementations.

FIG. 9 is an example block diagram of the source device 110 in accordance with some implementations. The source device 110 may include a processor 910, a memory 920, and a transceiver 930 (e.g., to communicate with destination device 120 and, in some embodiments, user device 160). Optionally, the source device 110 may further include a user interface 940 (e.g., user interface 400 of FIG. 4) and an audio input 950 to couple to an audio source 220 (FIG. 2). In other embodiments, the user interface 940 may be coupled to the source device 110.

Memory 920 may store a number of user profiles 990 (e.g., a user profile for each of users 1-N). As previously described, the user profiles 990 may be used to determine a user preference for a particular user of destination device 120, for example, to determine an encoded audio to be streamed. Memory 920 may also include a computer-readable medium (e.g., one or more nonvolatile memory elements, such as EPROM, EEPROM, Flash memory, a hard drive, and so on) that may store at least the following software modules that include instructions to be executed by the processor 910:

- an Available Bandwidth Determination Module 960 for determining an available bandwidth between the source device and the destination device;
- a Bit Rate Determination Module 970 for determining a bit rate for streaming the audio based on the available bandwidth;
- a Preferred Audio Characteristic Module 975 for determining a preferred audio characteristic for streaming the audio based on a user preference; and
- an Encoded Audio Determination Module 980 for determining encoded audio to be transmitted from the source device to the destination device based on the preferred audio characteristic and the determined bit rate.

Each software module includes program instructions that, when executed by the processor 910, may cause the source device 110 to perform the corresponding function(s). Thus, the non-transitory computer-readable storage medium of memory 920 may include instructions for performing all or a portion of the operations of FIGS. 6-8.

Processor 910 may be any suitable one or more processors capable of executing scripts or instructions of one or more software programs stored in the source device 110 (e.g., within memory 920). For example, processor 910 may execute the Available Bandwidth Determination Module 960 to determine an available bandwidth between the source device and the destination device. Processor 910 may execute the Bit Rate Determination Module 970 to determine a bit rate for streaming the audio based on the available bandwidth. Processor 910 may execute the Preferred Audio Characteristic Module 975 to determine a preferred audio characteristic for streaming the audio based on a user preference. Processor 910 may execute the Encoded Audio Determination Module 980 to determine encoded audio to be transmitted from the source device to the destination device based on the preferred audio characteristic and the determined bit rate.

Figure 10:
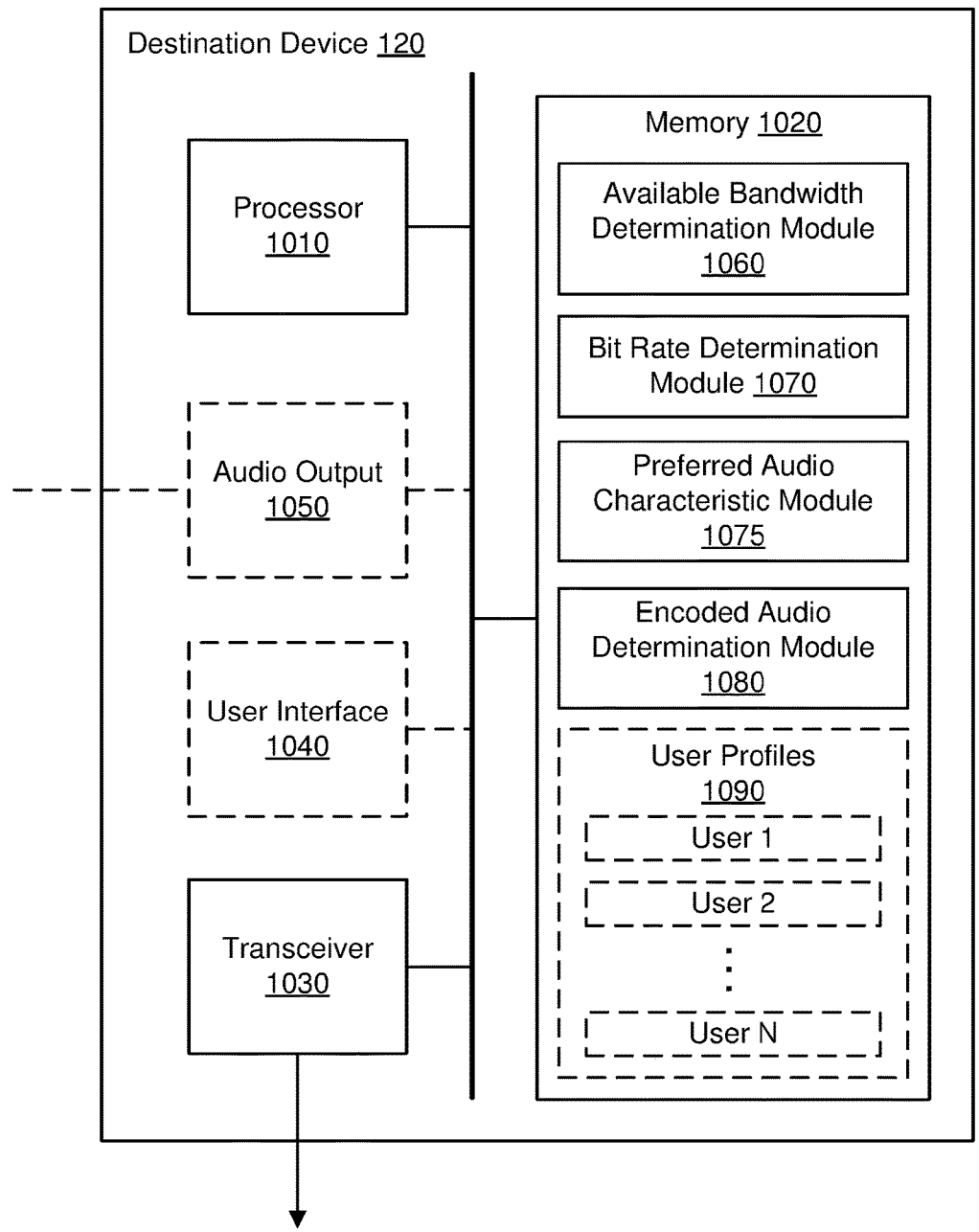
FIG. 10 is an example block diagram of the destination device of FIGS. 1A, 1B, and 3 in accordance with some implementations.

FIG. 10 is an example block diagram of the destination device 120 in accordance with some implementations. The destination device 120 may include a processor 1010, a memory 1020, and a transceiver 1030 (e.g., to communicate with source device 110 and, in some embodiments, the user device 160). Optionally, the source device 110 may further include a user interface 1040 (e.g., user interface 400 of FIG. 4) and an audio output 1050 to couple to output device(s) 320 (FIG. 3). In other embodiments, the output device(s) 320 of FIG. 3 may be integrated within the destination device 120 and/or the user interface 1040 may be coupled to the source device 110.

Memory 1020 may store a number of user profiles 1090 (e.g., a user profile for each of users 1-N). As previously described, the user profiles 1090 may be used to determine a user preference for a particular user in order to determine an encoded audio to be requested from source device 110. Memory 1020 may also include a computer-readable medium (e.g., one or more nonvolatile memory elements, such as EPROM, EEPROM, Flash memory, a hard drive, and so on) that may store at least the following software modules that include instructions to be executed by the processor 1010:

- an Available Bandwidth Determination Module 1060 for determining an available bandwidth between the source device and the destination device;
- a Bit Rate Determination Module 1070 for determining a bit rate for streaming the audio based on the available bandwidth;
- a Preferred Audio Characteristic Module 1075 for determining a preferred audio characteristic for streaming the audio based on a user preference and
- an Encoded Audio Determination Module 1080 for determining the encoded audio at a bit rate and with preferred audio characteristics.

Each software module includes program instructions that, when executed by the processor 1010, may cause the destination device 120 to perform the corresponding function(s). Thus, the non-transitory computer-readable storage medium of memory 1020 may include instructions for performing all or a portion of the operations of FIGS. 6-8.

Processor 1010 may be any suitable one or more processors capable of executing scripts or instructions of one or more software programs stored in the destination device 120 (e.g., within memory 1020). For example, processor 1010 may execute the Available Bandwidth Determination Module 1060 to determine an available bandwidth between the source device and the destination device. Processor 1010 may execute the Bit Rate Determination Module 1070 to determine a bit rate for streaming the audio based on the available bandwidth. Processor 1010 may execute the Preferred Audio Characteristic Module 1075 to determine a preferred audio characteristic for streaming the audio based on a user preference. Processor 1010 may execute the Encoded Audio Determination Module 1080 to determine encoded audio to be transmitted from the source device to the destination device based on the preferred audio characteristic and the determined bit rate.

Figure 11:
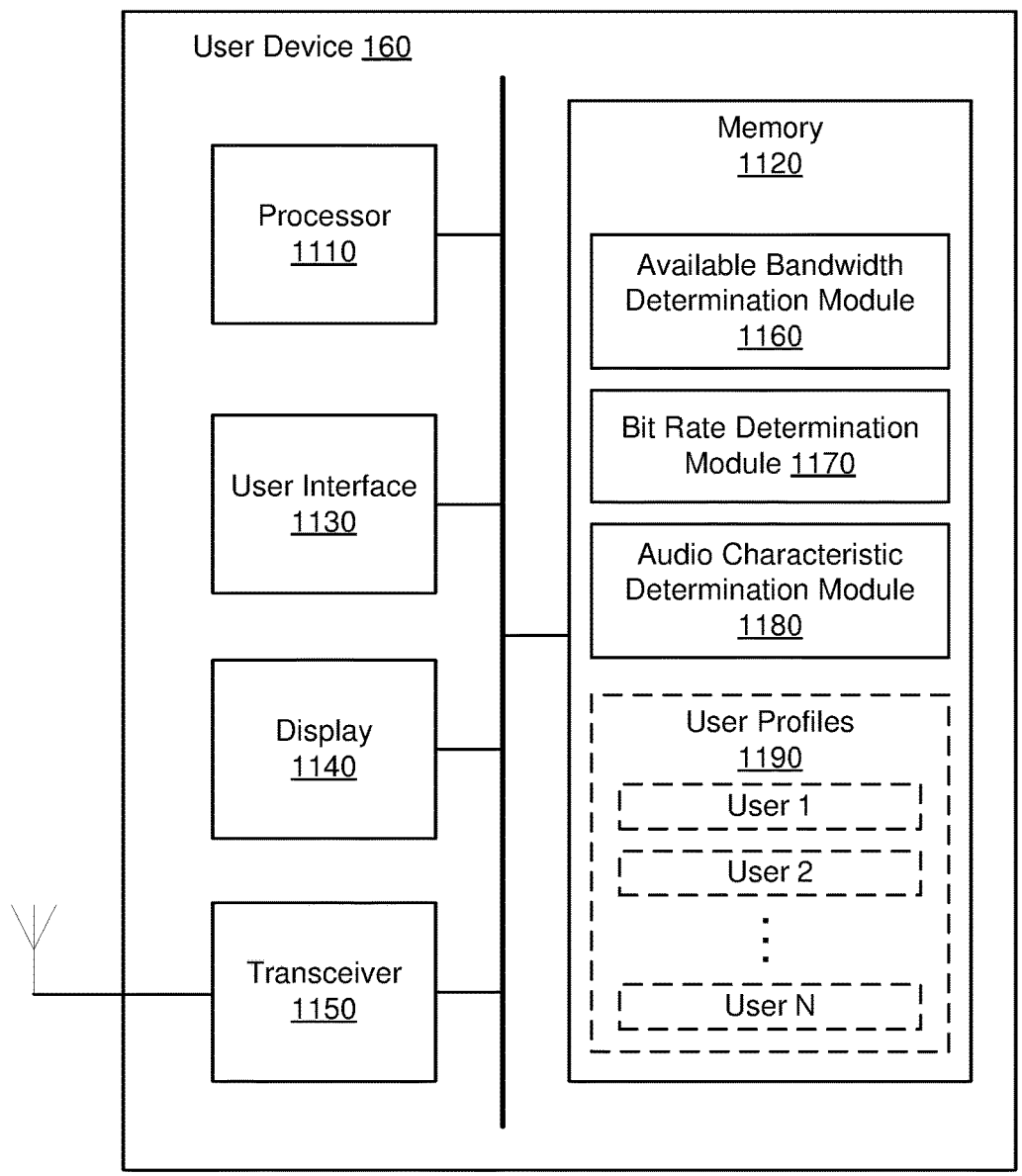
FIG. 11 is an example block diagram of the interface device of FIG. 4 in accordance with some implementations.

FIG. 11 is an example block diagram of the user device 160 in accordance with some implementations. The user device 160 may include a processor 1110, a memory 1120, a user interface 1130, a display 1140, and a transceiver 1150 (e.g., to communicate with the source device 110 and/or the destination device 120). In some embodiments, the user interface 1130 and the display 1140 may be combined (e.g., a touchscreen). Also, in some embodiments, the transceiver 1150 may communicate with the source device 110 and/or the destination device 120 through a wireless connection (e.g., using the illustrated antenna or a plurality of antennas) or a wired connection (not shown for simplicity).

Memory 1120 may store a number of user profiles 1190 (e.g., a user profile for each of users 1-N). As previously described, the user profiles 1190 may be used to determine a user preference for a particular user of destination device 120 in order to determine an encoded audio to be requested from source device 110. Memory 1020 may also include a computer-readable medium (e.g., one or more nonvolatile memory elements, such as EPROM, EEPROM, Flash memory, a hard drive, and so on) that may store at least the following software modules that include instructions to be executed by the processor 1010:

- an Available Bandwidth Determination Module 1160 for determining an available bandwidth between the source device and the destination device;
- a Bit Rate Determination Module 1170 for determining a bit rate for streaming the audio based on the available bandwidth; and
- an Audio Characteristic Determination Module 1180 for determining a preferred audio characteristic for streaming the audio based on a user preference.

Each software module includes program instructions that, when executed by the processor 1110, may cause the user device 160 to perform the corresponding function(s). Thus, the non-transitory computer-readable storage medium of memory 1120 may include instructions for performing all or a portion of the operations of FIGS. 6-8.

Processor 1110 may be any suitable one or more processors capable of executing scripts or instructions of one or more software programs stored in the user device 160 (e.g., within memory 1120). For example, processor 1110 may execute the Available Bandwidth Determination Module 1160 to determine an available bandwidth between the source device and the destination device. Processor 1110 may execute the Bit Rate Determination Module 1170 to determine a bit rate for streaming the audio based on the available bandwidth. Processor 1110 may execute the Audio Characteristic Determination Module 1180 to determine a preferred audio characteristic for streaming the audio based on a user preference.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer of source device 110, destination device 120, and/or user device 160 (see FIG. 1B). The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for streaming audio between a source device and a destination device, the method comprising:
   determining an available bandwidth between the source device and the destination device;
   determining a bit rate for streaming the audio based on the available bandwidth;
   determining a preferred audio characteristic for streaming the audio based on a user preference;
   determining encoded audio to be transmitted from the source device to the destination device based on the preferred audio characteristic and the determined bit rate, wherein the preferred audio characteristic comprises at least one from the group consisting of a spatial quality of the encoded audio and a timbral quality of the encoded audio; and
   presenting, on a user interface, a graph indicating the spatial quality of the encoded audio in relation to the timbral quality of the encoded audio.

2. The method of claim 1, further comprising:
   receiving the user preference via a user interaction with the graph.

3. The method of claim 1, further comprising:
   displaying, on the graph, a number of channels to be encoded versus a stream rate per channel for potential encoded audios, and
   displaying, on the graph, a marker that indicates the number of channels and the stream rate per channel of the encoded audio.

4. The method of claim 1, wherein the graph comprises a number of delineated areas each indicating, for a respective range of bit rates:
   a range of potential channels to be used for the encoded audio; and
   a range of potential bit rates to be used for each of the potential channels.

5. The method of claim 1, wherein the source device comprises the user interface, and the user preference is received from a creator of the audio via the user interface.

6. The method of claim 1, further comprising:
   creating a user profile including the preferred audio characteristic;
   storing the user profile; and
   accessing the user profile to determine the preferred audio characteristic.

7. The method of claim 1, wherein determining the available bandwidth is based on at least one from the group consisting of:
   an available bandwidth on a communication link between the source device and the destination device; and
   a maximum bandwidth allowed by the source device for a user.

8. The method of claim 1, further comprising:
   receiving the encoded audio from the source device;
   decoding the encoded audio into decoded audio information; and
   transmitting the decoded audio information to an output device.

9. The method of claim 8, wherein determining the encoded audio comprises:
   selecting the encoded audio from a plurality of candidate encoded audios having a same bit rate and different audio characteristics.

10. The method of claim 1, further comprising:
    transmitting the encoded audio to the destination device.

11. The method of claim 1, further comprising:
    determining a reduction in the available bandwidth;
    determining a new bit rate for streaming the audio from the source device to the destination device based on the reduction in the available bandwidth; and
    determining a new encoded audio to be transmitted from the source device to the destination device based on the preferred audio characteristic and the new bit rate.

12. A user device, comprising:
    a processor;
    a user interface coupled to the processor and configured to receive a user preference from a user; and
    a memory coupled to the processor and the user interface, the memory including one or more instructions that, when executed by the processor, cause the user device to:
      determine an available bandwidth for streaming audio between a source device and a destination device;
      determine a bit rate for streaming the audio based on the available bandwidth;
      determine a preferred audio characteristic for streaming the audio based on the user preference;
      determine encoded audio to be transmitted from the source device to the destination device based on the preferred audio characteristic and the determined bit rate, wherein the preferred audio characteristic comprises at least one from the group consisting of a spatial quality of the encoded audio and a timbral quality of the encoded audio; and
      present, on the user interface, a graph indicating the spatial quality of the encoded audio in relation to the timbral quality of the encoded audio.

13. The user device of claim 12, wherein execution of the one or more instructions causes the user device to:
    display, on the graph, a number of channels to be encoded versus a stream rate per channel for potential encoded audios, and
    display, on the graph, a marker that indicates the number of channels and the stream rate per channel of the encoded audio.

14. The user device of claim 12, wherein the source device comprises the user device.

15. The user device of claim 12, wherein execution of the one or more instructions causes the user device to:
    create a user profile including the preferred audio characteristic;
    store the user profile in the user device; and
    access the user profile to determine the preferred audio characteristic.

16. The user device of claim 12, wherein the available bandwidth is related to at least one from the group consisting of:
    an available bandwidth on a communication link between the source device and the destination device; and
    a maximum bandwidth allowed by the source device for the user.

17. The user device of claim 12, wherein execution of the one or more instructions causes the user device to:
    request the encoded audio from the source device;
    receive the encoded audio from the source device in response to the request; and
    decode the encoded audio into decoded audio information.

18. The user device of claim 17, wherein execution of the one or more instructions to determine the encoded audio causes the user device to:
  select the encoded audio from a plurality of candidate encoded audios having a same bit rate and different audio characteristics.

19. The user device of claim 12, wherein execution of the one or more instructions causes the user device to:
  determine a reduction in the available bandwidth;
  determine a new bit rate for streaming the audio from the source device to the destination device based on the reduction in the available bandwidth; and
  determine a new encoded audio to be transmitted based on the preferred audio characteristic and the new bit rate.

20. A non-transitory computer readable medium comprising one or more instructions that, when executed by a processor of a user device, cause the user device to:
  receive a user preference from a user;
  determine an available bandwidth for streaming audio between a source device and a destination device;
  determine a bit rate for streaming the audio based on the available bandwidth;
  determine a preferred audio characteristic for streaming the audio based on the user preference;
  determine encoded audio to be transmitted from the source device to the destination device based on the preferred audio characteristic and the determined bit rate, wherein the preferred audio characteristic comprises at least one from the group consisting of a spatial quality of the encoded audio and a timbral quality of the encoded audio; and
  present, on a user interface, a graph indicating the spatial quality of the encoded audio in relation to the timbral quality of the encoded audio.

21. The non-transitory computer readable medium of claim 20, wherein execution of the one or more instructions causes the user device to:
  display, on the graph, a number of channels to be encoded versus a stream rate per channel for potential encoded audios, and
  display, on the graph, a marker that indicates the number of channels and the stream rate per channel of the encoded audio.

22. The non-transitory computer readable medium of claim 20, wherein the available bandwidth is related to at least one from the group consisting of:
  an available bandwidth on a communication link between the source device and the destination device; and
  a maximum bandwidth allowed by the source device for the user.

23. The non-transitory computer readable medium of claim 20, wherein execution of the one or more instructions causes the user device to:
  request the encoded audio from the source device;
  receive the encoded audio from the source device in response to the request; and
  decode the encoded audio into decoded audio information.

24. The non-transitory computer readable medium of claim 23, wherein execution of the one or more instructions causes the user device to:
  select the encoded audio from a plurality of candidate encoded audios having a same bit rate and different audio characteristics.

25. A user device to assist with streaming audio between a source device and a destination device, the user device comprising:
  means for receiving a user preference from a user;
  means for determining an available bandwidth between the source device and the destination device;
  means for determining a bit rate for streaming the audio based on the available bandwidth;
  means for determining a preferred audio characteristic for streaming the audio based on the user preference; and
  means for determining encoded audio to be transmitted from the source device to the destination device based on the preferred audio characteristic and the determined bit rate, wherein the preferred audio characteristic comprises at least one from the group consisting of a spatial quality of the encoded audio and a timbral quality of the encoded audio; and
  means for presenting, on a user interface, a graph indicating the spatial quality of the encoded audio in relation to the timbral quality of the encoded audio.

26. The user device of claim 12, wherein execution of the instructions further causes the user device to receive the user preference via a user interaction with the graph.

27. The non-transitory computer readable medium of claim 20, wherein execution of the one or more instructions causes the user device to receive the user preference via a user interaction with the graph.

28. The user device of claim 25, further comprising means for receiving the user preference via a user interaction with the graph.

* * * * *